United States Patent
Akl et al.

(10) Patent No.: US 11,611,997 B2
(45) Date of Patent: Mar. 21, 2023

(54) RANDOM ACCESS CHANNEL (RACH) OPTIMIZATION FOR INTERFERENCE COORDINATION IN AN INTEGRATED ACCESS AND BACKHAUL (IAB) NETWORK

(71) Applicant: QUALCOMM Incorporated, San Diego, CA (US)

(72) Inventors: Naeem Akl, Somerville, NJ (US); Navid Abedini, Somerset, NJ (US); Jianghong Luo, Skillman, NJ (US); Luca Blessent, Whitehouse Station, NJ (US); Karl Georg Hampel, Hoboken, NJ (US); Junyi Li, Chester, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 63 days.

(21) Appl. No.: 17/096,580

(22) Filed: Nov. 12, 2020

(65) Prior Publication Data

US 2021/0212126 A1 Jul. 8, 2021

Related U.S. Application Data

(60) Provisional application No. 62/956,885, filed on Jan. 3, 2020.

(51) Int. Cl.
*H04W 74/08* (2009.01)
*H04W 72/08* (2009.01)
(Continued)

(52) U.S. Cl.
CPC ..... *H04W 74/0833* (2013.01); *H04W 52/242* (2013.01); *H04W 56/001* (2013.01); *H04W 72/082* (2013.01); *H04W 72/085* (2013.01)

(58) Field of Classification Search
CPC ........... H04W 74/0833; H04W 52/242; H04W 52/243; H04W 56/001; H04W 72/082; H04W 72/085; H04J 11/0056
See application file for complete search history.

(56) References Cited

U.S. PATENT DOCUMENTS

| 2014/0169260 A1* | 6/2014 | Nishio | H04W 74/006 370/312 |
| 2015/0237655 A1* | 8/2015 | Lu | H04W 72/1289 370/329 |

(Continued)

OTHER PUBLICATIONS

Ericsson: "SSB-Based IAB Node Discovery and Measurement", 3GPP Draft, R1-1910901, 3GPP TSG-RAN WG1 #98bis, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 4, 2019 (Oct. 4, 2019), XP051808290, 8 Pages, Retrieved from the Internet: URL:https://ftp.3gpp.org/tsg_ran/WG1_RL1/TSGR1_98b/Docs/R1-1910901.zip R1-1910901.Docx [retrieved on Oct. 4, 2019] Paragraphs [0001], [0002].

(Continued)

*Primary Examiner* — Ricardo H Castaneyra
(74) *Attorney, Agent, or Firm* — Patterson + Sheridan LLP

(57) ABSTRACT

Aspects of the present disclosure provide techniques for interference coordination between wireless nodes (e.g., nodes of an Integrated Access and Backhaul (IAB) network). The techniques generally include determining, by a first wireless node, resources for sending an indication of interference coordination to a second wireless node, and sending the indication to the second wireless node using the determined resources, as part of an interference coordination procedure.

20 Claims, 10 Drawing Sheets

(51) Int. Cl.
*H04W 56/00* (2009.01)
*H04W 52/24* (2009.01)

(56) References Cited

U.S. PATENT DOCUMENTS

| | | | | |
|---|---|---|---|---|
| 2015/0296525 A1* | 10/2015 | Kim | ............... | H04B 17/318 370/329 |
| 2018/0220428 A1* | 8/2018 | Sun | ............... | H04W 74/008 |
| 2019/0132096 A1 | 5/2019 | Abedini et al. | | |
| 2019/0158337 A1* | 5/2019 | Yoon | ............... | H04L 27/2613 |
| 2019/0357262 A1* | 11/2019 | Cirik | ............... | H04W 74/0833 |
| 2019/0394799 A1 | 12/2019 | Islam et al. | | |
| 2020/0084642 A1* | 3/2020 | Siomina | ............... | H04W 24/02 |
| 2020/0229271 A1* | 7/2020 | You | ............... | H04W 56/001 |

OTHER PUBLICATIONS

Huawei, et al., "Consideration on Cross-link Interference in IAB", 3GPP Draft, R1-1812203, 3GPP TSG RAN WG1 Meeting #95, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018 (Nov. 11, 2018), 10 pages, XP051554075, Retrieved from the Internet: URL: http://www.3gpp.org/ftp/Meetings%5F3GPP%5FSYNC/RAN1/Docs/R1%2D1812283%2Ezip, [retrieved on Nov. 11, 2018] Consideration on CLI measurement framework; p. 5, paragraph 3.1—p. 7; figures 8,9 Consideration on CLI mitigation method; p. 7, paragraph 3.2—p. 8.

International Search Report and Written Opinion—PCT/US2020/060450—ISA/EPO—dated Jan. 26, 2021.

NTT Docomo, et al., "Remaining Issues on PRACH Formats", 3GPP Draft, 3GPP TSG RAN WG1 Meeting #93, R1-1807053_Remaining Issues on PRACH Formats _Final, 3rd Generation Partnership Project (3GPP), Mobile Competence Centre, 650, Route Des Lucioles, F-06921 Sophia-Antipolis Cedex, France vol. RAN WG1, No. Busan, Korea, May 21, 2018-May 25, 2018, May 12, 2018 (May 12, 2018), XP051462874, pp. 1-11, Retrieved from the Internet: URL: http://www.3gpp.org/ftp/tsg%5Fran/WG1%5FRL1/TSGR1%5F93/Docs [retrieved on May 12, 2018] Paragraph [0002].

Qualcomm Incorporated: "Enhancements to Support NR Backhaul Links", 3GPP Draft, R1-1809442, 3GPP TSG RAN WG1 Meeting #94, 3rd Generation Partnership Project (3GPP), Mobile Competence Centre, 650, Route Des Lucioles, F-06921, Sophia-Antipolis Cedex, France, vol. RAN WG1, No. Gothenburg, Sweden, Aug. 20, 2018-Aug. 24, 2018, Aug. 17, 2018 (Aug. 17, 2018), XP051516807, 19 Pages, Retrieved from the Internet: URL:http://www.3gpp.org/ftp/tsg%5Fran/WG1%5FRL1/TSGR1%5F94/Docs/R1%2D1809442%2Ezip [retrieved on Aug. 17, 2018] Paragraphs [02.2], [02.7], [02.8].

\* cited by examiner

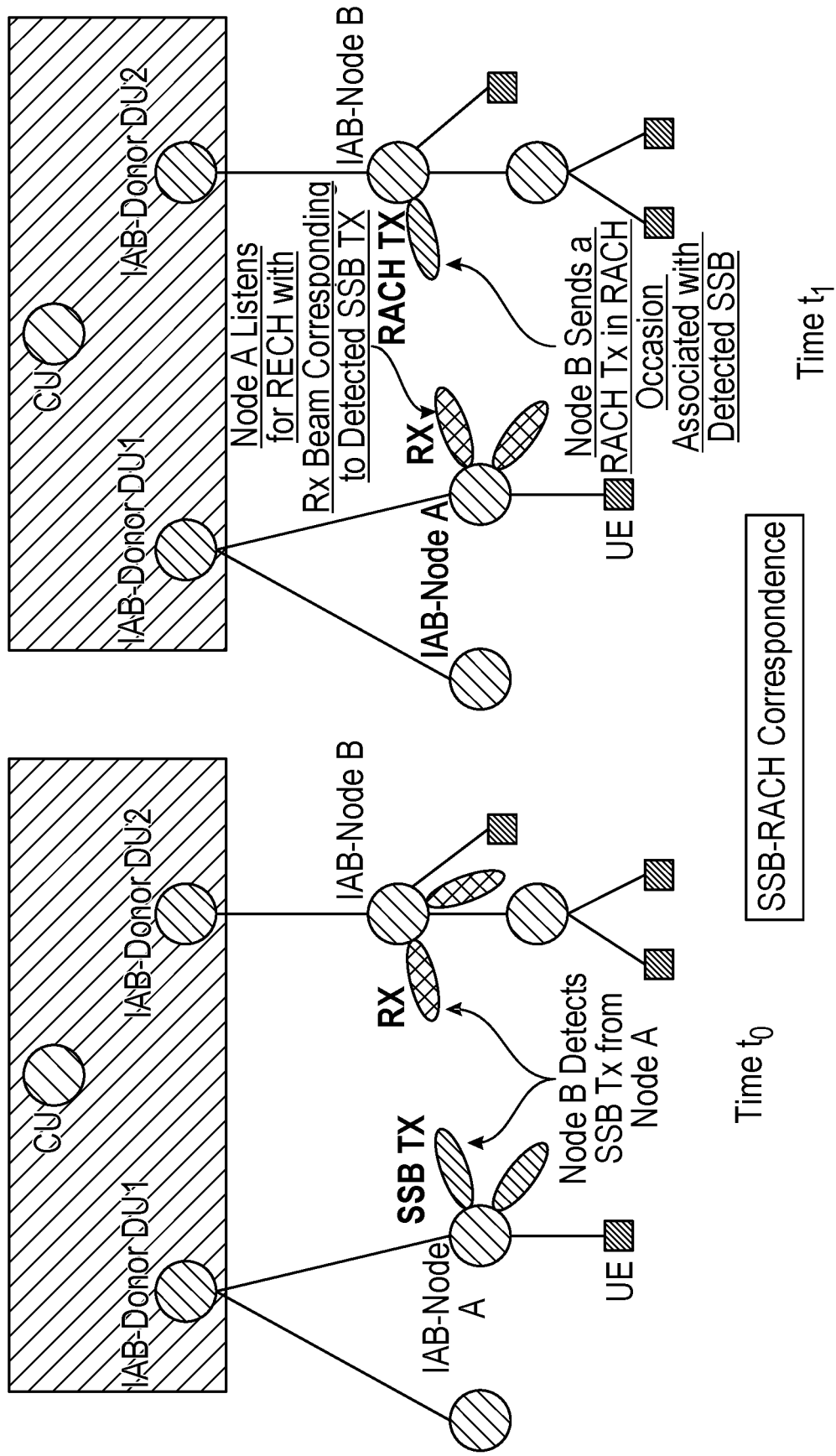

RANDOM ACCESS CHANNEL (RACH) OPTIMIZATION FOR INTERFERENCE COORDINATION IN AN INTEGRATED ACCESS AND BACKHAUL (IAB) NETWORK

CROSS REFERENCE TO RELATED APPLICATION

This Application hereby claims priority under 35 U.S.C. § 119 to U.S. Provisional Patent Application No. 62/956,885, filed on Jan. 3, 2020, the contents of which are incorporated herein in their entirety.

FIELD OF DISCLOSURE

Aspects of the present disclosure relate to wireless communications, and more particularly, to techniques for interference coordination between wireless nodes, for example, of an Integrated Access and Backhaul (IAB) network or other type of network.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

In some cases, wireless nodes implementing the features described above may be deployed in a flexible manner, in an arrangement referred to as an integrated access and backhaul (IAB) network. In an IAB network, one or more IAB donors connect to a core network via a wired connection (for example, as a wireline fiber), and provide access to one or more other nodes, referred to as child nodes. Child nodes may, in turn, serve as parent nodes to other child nodes.

In IAB networks, there is a potential for transmissions from one wireless node to cause interference to one or more other nodes. Aspects of the present disclosure provide mechanisms to reduce or mitigate the effects of such interference.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between wireless communication devices.

Certain aspects provide a method for wireless communications by a first wireless node. The method generally includes determining resources for sending an indication of interference coordination to a second wireless node and sending the indication to the second wireless node using the determined resources, as part of an interference coordination procedure.

Certain aspects provide a method for wireless communications by a first wireless node. The method generally includes detecting an indication of interference coordination sent from a second wireless node as part of an interference coordination procedure and participating in the interference coordination procedure with the second wireless node based on the indication.

Certain aspects provide an apparatus for wireless communications by a first wireless node. The apparatus generally includes means for determining resources for sending an indication of interference coordination to a second wireless node and means for sending the indication to the second wireless node using the determined resources, as part of an interference coordination procedure.

Certain aspects provide an apparatus for wireless communications by a first wireless node. The apparatus generally includes means for detecting an indication of interference coordination sent from a second wireless node as part of an interference coordination procedure and means for participating in the interference coordination procedure with the second wireless node based on the indication.

Certain aspects provide an apparatus for wireless communications by a first wireless node. The apparatus generally includes a processing system configured to determine resources for sending an indication of interference coordination to a second wireless node and an interface configured to output the indication for transmission to the second wireless node using the determined resources, as part of an interference coordination procedure.

Certain aspects provide an apparatus for wireless communications by a first wireless node. The apparatus generally includes a processing system configured to detect an indication of interference coordination sent from a second wireless node as part of an interference coordination procedure and participate in the interference coordination procedure with the second wireless node based on the indication.

Certain aspects provide a first wireless node that generally includes a processing system configured to determine resources for sending an indication of interference coordination to a second wireless node and a transmitter configured to transmit the indication to the second wireless node using the determined resources, as part of an interference coordination procedure.

Certain aspects provide a first wireless node that generally includes at least one antenna and a processing system configured to detect, via the at least one antenna, an indication of interference coordination sent from a second wireless node as part of an interference coordination procedure and participate in the interference coordination procedure with the second wireless node based on the indication.

Certain aspects provide a computer-readable medium for wireless communication. The computer-readable medium generally includes codes executable to determine resources for sending an indication of interference coordination to a second wireless node and output the indication for transmission to the second wireless node using the determined resources, as part of an interference coordination procedure.

Certain aspects provide a computer-readable medium for wireless communication. The computer-readable medium generally includes codes executable to detect an indication of interference coordination sent from a second wireless node as part of an interference coordination procedure and participate in the interference coordination procedure with the second wireless node based on the indication.

Aspects of the present disclosure provide wireless nodes, means for, apparatuses, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIGS. 9A and 9B illustrate an example use of a synchronization signal block (SSB) and random access channel (RACH) mechanism for interference coordination purposes, in accordance with various aspects of the disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide techniques for interference coordination between wireless nodes, for example, of an Integrated Access and Backhaul (IAB) network. As will be described in greater detail below, in some cases, a random access channel (RACH) mechanism may be leveraged to provide interference coordination between wireless nodes of an IAB network. In some cases, the interference coordination may include the sharing of power management priority values, used to determine which nodes should adjust their transmission (TX) configurations in an effort to reduce interference to other nodes.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
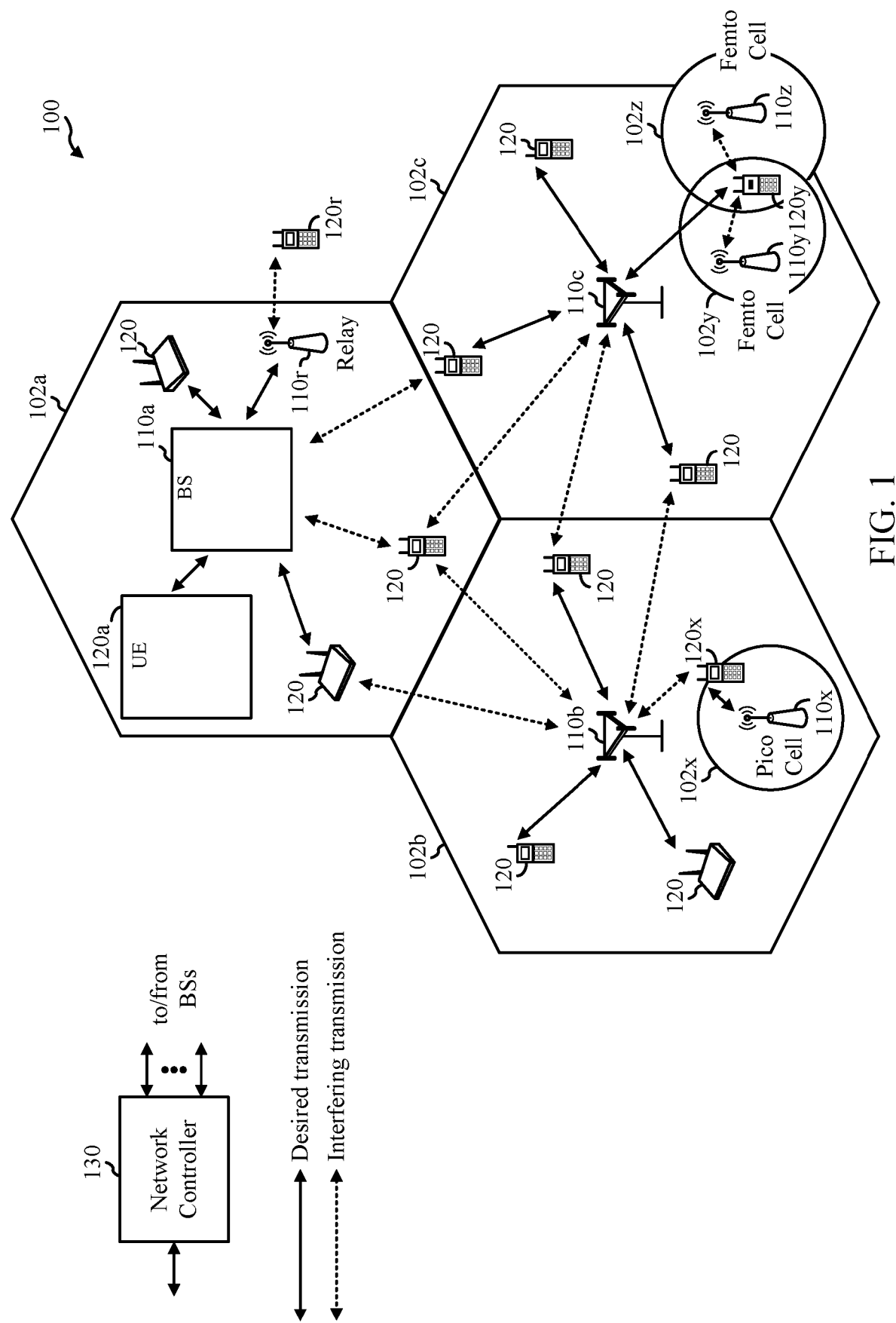
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the network 100 may include IAB-nodes (e.g., implemented as a UE 120 or BS 110) configured to perform operations 700 of FIG. 7 and/or operations 800 of FIG. 8.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 20x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
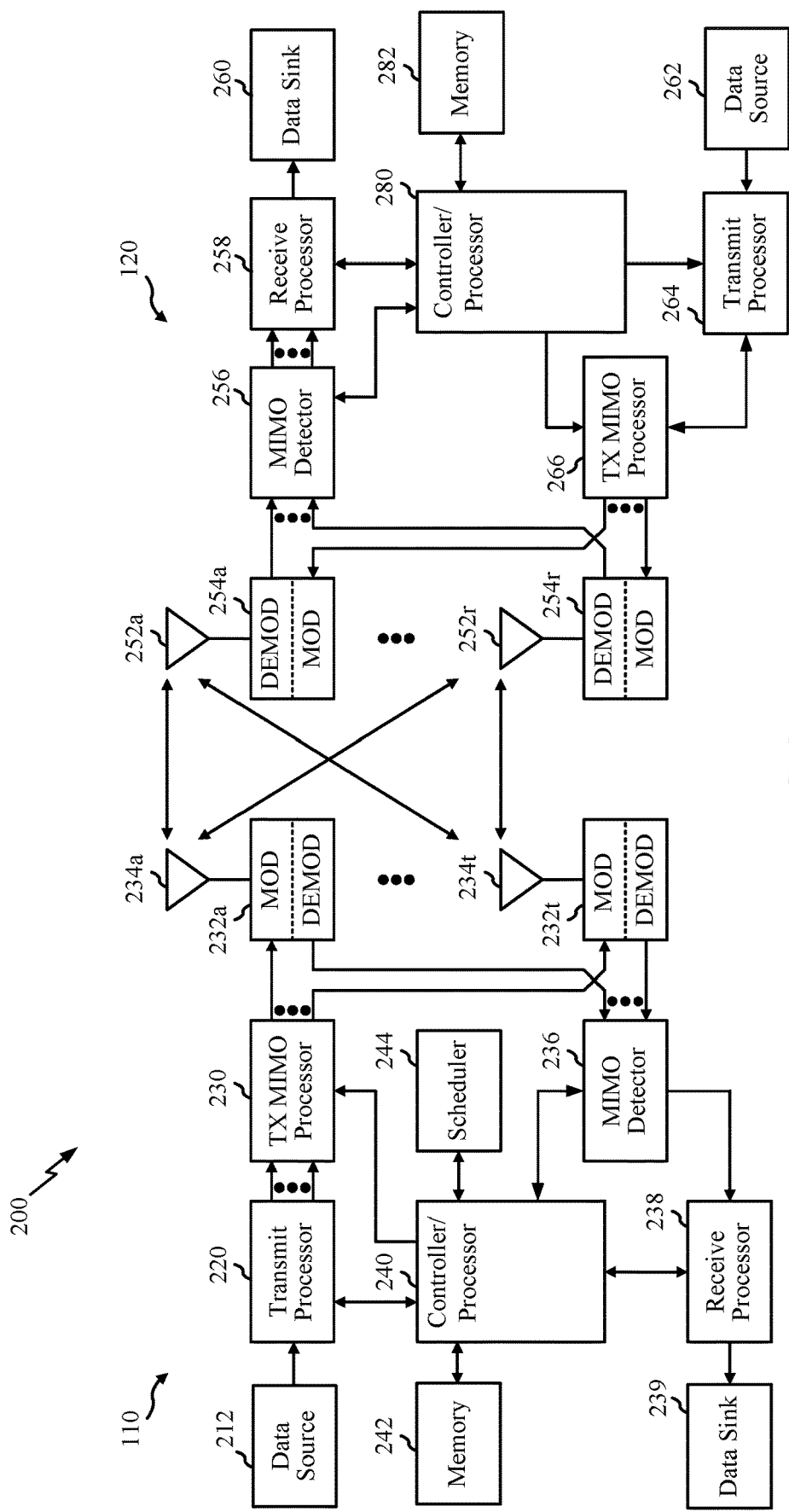
FIG. 2 is a block diagram conceptually illustrating a design of an example a base station (BS) and user equipment (UE), in accordance with certain aspects of the present disclosure.

FIG. 2 illustrates example components 200 of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein.

It should be noted that though FIG. 2 illustrates UE 120 communicating with a BS 110, a child IAB-node may similar communicate with a parent IAB-node (or other network entity) and each may (e.g., respectively) have similar components as discussed with respect to FIG. 2. In other words, a child IAB-node and/or parent IAB-node may have similar components as BS 110 or UE 120 and may be configured to perform operations 700 of FIG. 7 and/or operations 800 of FIG. 8.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive downlink signals from the BS 110 or a parent IAB-node, or a child IAB-node may receive downlink signals from a parent IAB-node, and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120 or a child IAB-node, a transmit processor 264 may receive and process data (e.g., for the physical uplink shared channel (PUSCH) or the PSSCH) from a data source 262 and control information (e.g., for the physical uplink control channel (PUCCH) or the PSCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110 or a parent IAB-node.

At the BS 110 or a parent IAB-node, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of processes for the techniques described herein. The controller/processor 280 and/or other processors and modules at the UE 120 may perform or direct the execution of processes for the techniques described herein. The memories 242, 282 may store data and program codes for BS 110 and UE 120, respectively. A scheduler 244 may schedule UEs for data transmission on the downlink and/or uplink.

Figure 3:
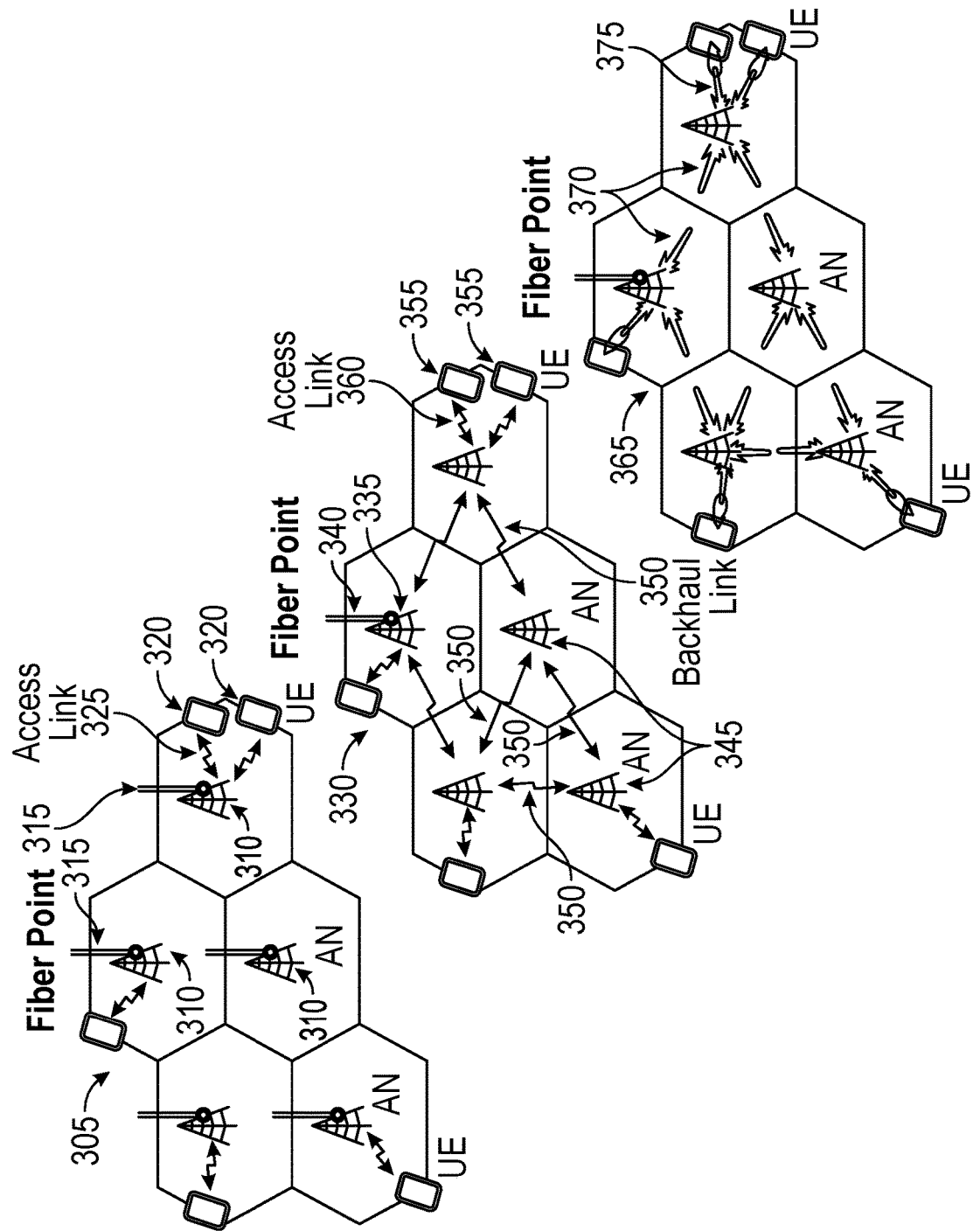
FIG. 3 is a diagram illustrating examples of radio access networks, in accordance with various aspects of the present disclosure.

FIG. 3 is a diagram illustrating examples of radio access networks, in accordance with various aspects of the disclosure.

As shown by reference number 305, a traditional (for example, 3G, 4G, LTE) radio access network may include multiple base stations 310 (for example, access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may correspond to a base station 110 shown in FIG. 1. Similarly, a UE 320 shown in FIG. 3 may correspond to a UE 120 shown in FIG. 1.

As shown by reference number 330, a radio access network may include a wireless backhaul network. In some aspects or scenarios, a wireless backhaul network may sometimes be referred to as an integrated access and backhaul (IAB) network. An IAB network may include multiple base stations and sometimes the base stations may be of differing types or have differing operational characteristics. For example, in some aspects, an IAB network may have at least one base station that is an anchor base station 335. The anchor base station may communicates with a core network via a wired backhaul link 340, such as a fiber connection. An anchor base station 335 may also be referred to as an IAB donor. An IAB donor is an access node with wireline connection to a core network. An IAB node is an access node that relays traffic from/to Anchor through one or multiple hops. Anchor base stations can be configured to communicate with other types of base stations or other communication devices (e.g. in a radio network or IAB network).

The IAB network may also include one or more non-anchor base stations 345. Non-anchor base stations may be referred to as relay base stations or IAB nodes. The non-anchor base station 345 may communicate directly with or indirectly with (for example, via one or more other non-anchor base stations 345) the anchor base station 335 via one or more backhaul links 350 to form a backhaul path to the core network for carrying backhaul traffic. Backhaul link 350 may be a wireless link. Anchor base station(s) 335 or non-anchor base station(s) 345 may communicate with one or more UEs 355 via access links 360, which may be wireless links for carrying access traffic. In some aspects, an anchor base station 335 or a non-anchor base station 345 shown in FIG. 3 may correspond to a base station 110 shown in FIG. 1. Similarly, a UE 355 shown in FIG. 3 may correspond to a UE 120 shown in FIG. 1.

As shown by reference number 365, in some aspects, a radio access network that includes an IAB network may utilize a variety of spectrum types. For example, an IAB network may utilize a variety of differing radio frequency bands. In a few particular examples and according to some aspects, millimeter wave technology or directional communications can be utilized (for example, beamforming, precoding) for communications between base stations or UEs (for example, between two base stations, between two UEs, or between a base station and a UE). In additional or alternative aspects or examples, wireless backhaul links 370 between base stations may use millimeter waves to carry information or may be directed toward a target base station using beamforming, precoding. Similarly, the wireless access links 375 between a UE and a base station may use millimeter waves or may be directed toward a target wireless node (for example, a UE or a base station). In this way, inter-link interference may be reduced.

In some aspects, an IAB network may support a multi-hop network or a multi-hop wireless backhaul. Additionally, or alternatively, each node of an IAB network may use the same radio access technology (for example, 5G/NR). Additionally, or alternatively, nodes of an IAB network may share resources for access links and backhaul links, such as time resources, frequency resources, and spatial resources. Furthermore, various architectures of IAB nodes or IAB donors may be supported.

In some aspects, an IAB donor may include a central unit (CU) that configures IAB nodes that access a core network via the IAB donor and may include a distributed unit (DU) that schedules and communicates with child nodes of the IAB donor.

In some aspects, an IAB node may include a mobile termination component (MT) that is scheduled by and communicates with a DU of a parent node, and may include a DU that schedules and communicates with child nodes of the IAB node. A DU of an IAB node may perform functions described in connection with base station 110 for that IAB node, and an MT of an IAB node may perform functions described in connection with UE 120 for that IAB node.

Figure 4:
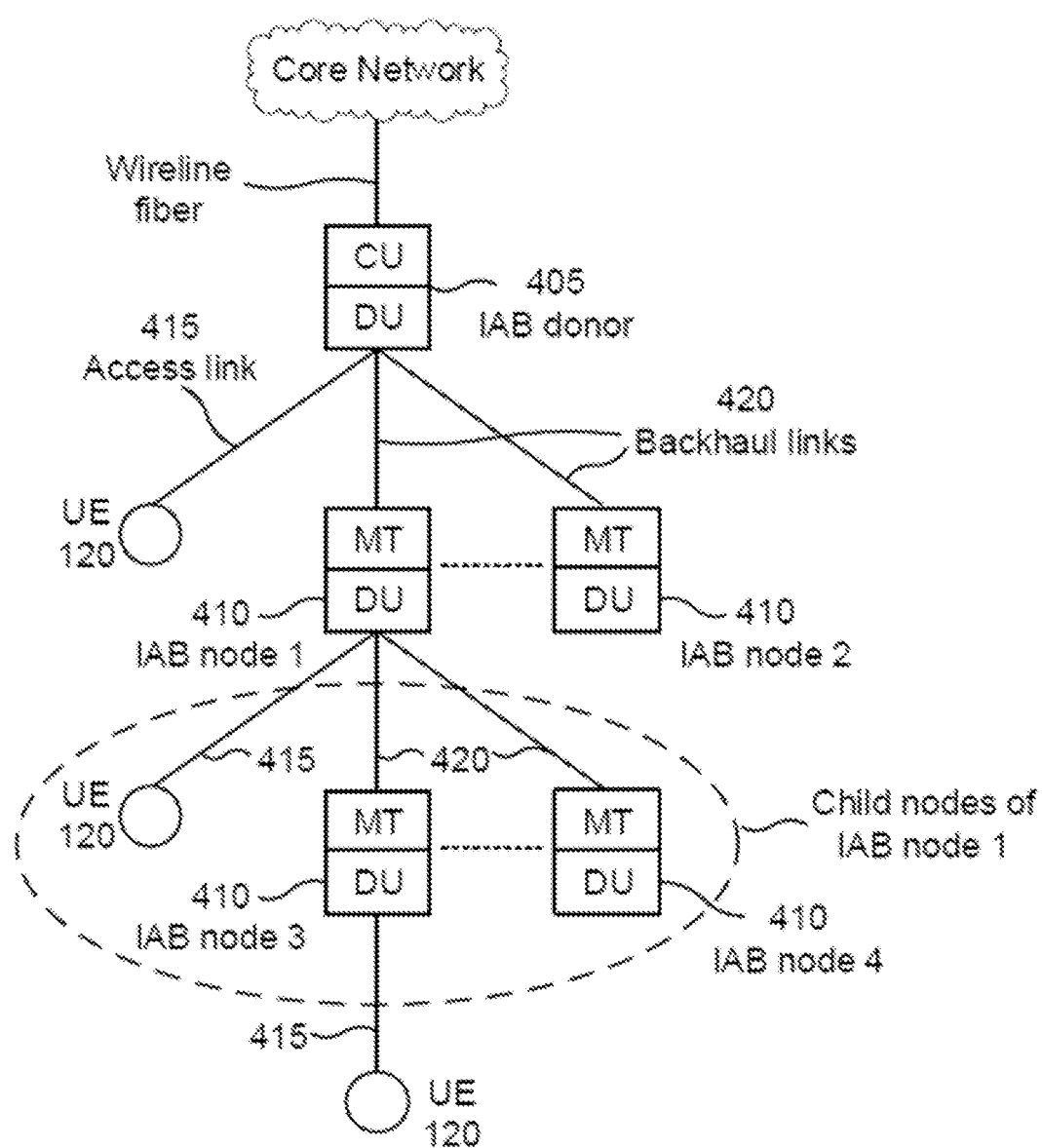
FIG. 4 is a diagram illustrating an example of an integrated access and backhaul (IAB) network architecture in accordance with various aspects of the disclosure.

FIG. 4 is a diagram illustrating an example of an IAB network architecture, in accordance with various aspects of the disclosure. As shown in FIG. 4, an IAB network may include an IAB donor 405 that connects to a core network via a wired connection (for example, as a wireline fiber). For example, an Ng interface of an IAB donor 405 may terminate at a core network. Additionally, or alternatively, an IAB donor 405 may connect to one or more devices of the core network that provide a core access and mobility management function (AMF). In some aspects, an IAB donor 405 may include a base station 110, such as an anchor base station, as described above in connection with FIG. 3. As shown, an IAB donor 405 may include a CU, which may perform ANC functions or AMF functions. The CU may configure a DU of the IAB donor 405 or may configure one or more IAB nodes 410 (for example, an MT or a DU of an IAB node 410) that connect to the core network via the IAB donor 405. Thus, a CU of an IAB donor 405 may control or configure the entire IAB network that connects to the core network via the IAB donor 405, such as by using control messages or configuration messages (for example, a radio resource control (RRC) configuration message, an F1 application protocol (FLAP) message).

As described above, the IAB network may include IAB nodes 410 (shown as IAB nodes 1 through 4) that connect to the core network via the IAB donor 405. As shown, an IAB node 410 may include an MT and may include a DU. The MT of an IAB node 410 (for example, a child node) may be controlled or scheduled by another IAB node 410 (for example, a parent node) or by an IAB donor 405. The DU of an IAB node 410 (for example, a parent node) may control or schedule other IAB nodes 410 (for example, child nodes of the parent node) or UEs 120. Thus, a DU may be referred to as a scheduling node or a scheduling component, and an MT may be referred to as a scheduled node or a scheduled component. In some aspects, an IAB donor 405 may include a DU and not an MT. That is, an IAB donor 405 may configure, control, or schedule communications of IAB nodes 410 or UEs 120. A UE 120 may include only an MT, and not a DU. That is, communications of a UE 120 may be controlled or scheduled by an IAB donor 405 or an IAB node 410 (for example, a parent node of the UE 120).

According to some aspects, certain nodes may be configured to participate in control/scheduling processes. For example in some aspects, when a first wireless node controls or schedules communications for a second wireless node (for example, when the first wireless node provides DU functions for the second wireless node's MT), the first wireless node may be referred to as a parent node of the second wireless node, and the second wireless node may be referred to as a child node of the first wireless node. A child node of the second wireless node may be referred to as a grandchild node of the first wireless node. Thus, a DU of a parent node may control or schedule communications for child nodes of the parent node. A parent node may be an IAB donor 405 or an IAB node 410, and a child node may be an IAB node 410 or a UE 120. Communications of an MT of a child node may be controlled or scheduled by a parent node of the child node.

As further shown in FIG. 4, a link between a UE 120 and an IAB donor 405, or between a UE 120 and an IAB node 410, may be referred to as an access link 415. Each access link 415 may be a wireless access link that provides a UE 120 with radio access to a core network via the IAB donor 405, and potentially via one or more IAB nodes 410.

As further shown in FIG. 4, a link between an IAB donor 405 and an IAB node 410, or between two IAB nodes 410, may be referred to as a backhaul link 420. Each backhaul link 420 may be a wireless backhaul link that provides an IAB node 410 with radio access to a core network via the IAB donor 405, and potentially via one or more other intermediate IAB nodes 410. In some aspects, a backhaul link 420 may be a primary backhaul link or a secondary backhaul link (for example, a backup backhaul link). In some aspects, a secondary backhaul link may be used if a primary backhaul link fails, becomes congested, or becomes overloaded. In an IAB network, network resources for wireless communications (for example, time resources, frequency resources, spatial resources) may be shared between access links 415 and backhaul links 420.

As described above, in a typical IAB network, IAB nodes (for example, non-anchor base stations) are stationary (that is, non-moving). Next generation (5G) wireless networks have stated objectives to provide ultra-high data rate and support wide scope of application scenarios. Integrated access and backhaul (IAB) systems have been studied in 3GPP as one possible solution to help support these objectives.

As noted above, in IAB, a wireless backhaul solution is adopted to connect cells (IAB-nodes) to the core network (which uses a wired backhaul). Some attractive characteristics of IAB are support for multi-hop wireless backhaul, sharing of the same technology (e.g., NR) and resources (e.g., frequency bands) for both access and backhaul links.

There are various possible architectures for IAB-nodes, including layer-2 (L2) and layer-3 (L3) solutions and a particular architecture deployed may depend on what layers of protocol stack are implemented in the intermediate nodes (IAB-nodes), for example, L2 relays may implement PHY/MAC/RLC layers.

As described herein, an IAB donor may be an enhanced gNB node with functions to control IAB-network. A CU may refer to the central entity that controls the entire IAB-network through configuration. The CU holds RRC/PDCP layer functions. A DU may be a scheduling node that schedules child nodes of this IAB-donor. The DU holds RLC/MAC/PHY layer functions. An IAB-node is a L2 relay node consisting of MT and DU functions, as described herein. MT is a scheduled node similar to UE scheduled by its parent IAB-node or IAB-donor. A DU is a scheduling node that schedules child nodes of this IAB-node.

Example RACH Procedure

A random-access channel (RACH) is so named because it refers to a wireless channel (medium) that may be shared by multiple UEs and used by the UEs to (randomly) access the network for communications. For example, the RACH may be used for call setup and to access the network for data transmissions. In some cases, RACH may be used for initial access to a network when the UE switches from a radio resource control (RRC) connected idle mode to active mode, or when handing over in RRC connected mode. Moreover, RACH may be used for downlink (DL) and/or uplink (UL) data arrival when the UE is in RRC idle or RRC inactive modes, and when reestablishing a connection with the network.

Typically, a UE monitors SSB transmissions which are sent (by a gNB using different beams) and are associated with a finite set of time/frequency resources defining RACH occasions (ROs). As will be described in greater detail below, upon detecting an SSB, the UE may select an RO associated with that SSB for a msgA transmission. The finite set of ROs may help reduce monitoring overhead (blind decodes) by a base station. In other words, by associating a finite set of ROs with SSB transmissions, a gNB knows when, where, and in what direction to "listen" for RACH transmissions from a UE.

Figure 5:
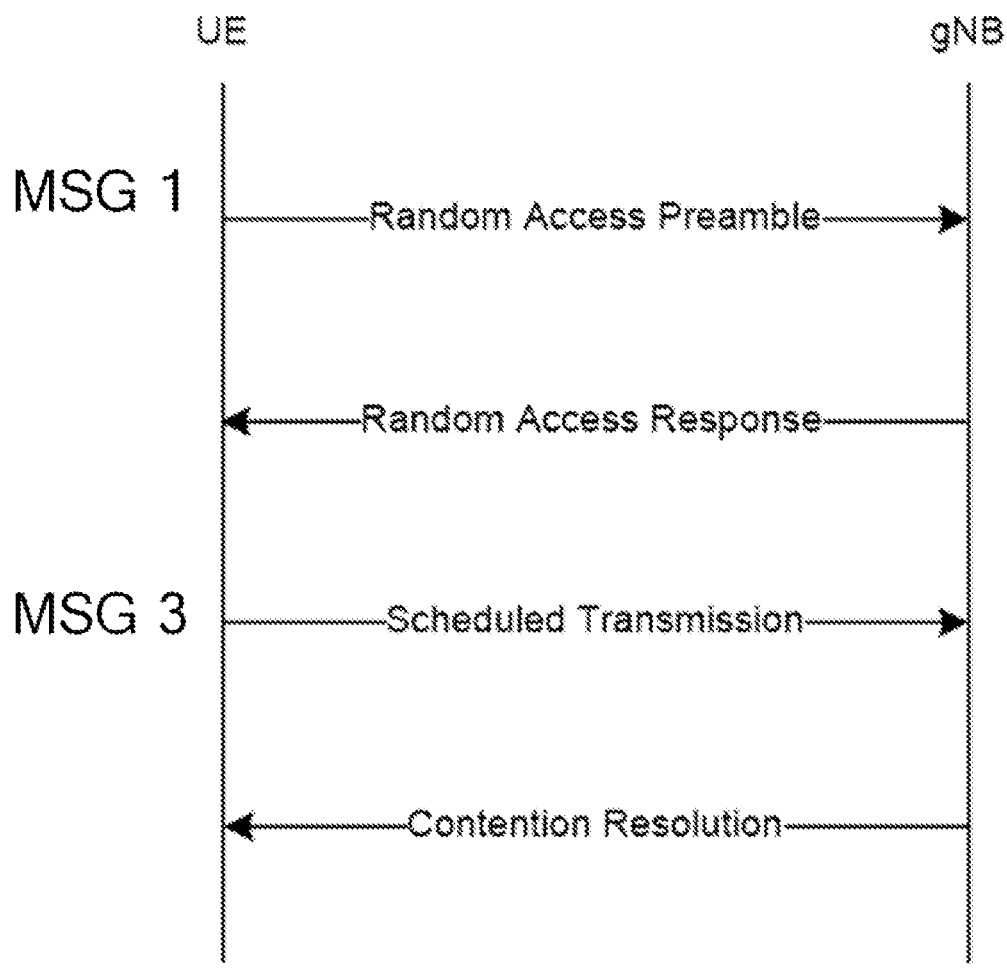
FIG. 5 is a timing diagram illustrating an example four-step RACH procedure, in accordance with certain aspects of the present disclosure.

FIG. 5 is a timing (or "call-flow") diagram 500 illustrating an example four-step RACH procedure, in accordance with certain aspects of the present disclosure. A first message (MSG1) may be sent from the UE 120 to BS 110 on the physical random access channel (PRACH). In this case, MSG1 may only include a RACH preamble. BS 110 may respond with a random access response (RAR) message (MSG2) which may include the identifier (ID) of the RACH preamble, a timing advance (TA), an uplink grant, cell radio network temporary identifier (C-RNTI), and a back off indicator. MSG2 may include a PDCCH communication including control information for a following communication on the PDSCH, as illustrated. In response to MSG2, MSG3 is transmitted from the UE 120 to BS 110 on the PUSCH. MSG3 may include one or more of a RRC connection request, a tracking area update request, a system information request, a positioning fix or positioning signal request, or a scheduling request. The BS 110 then responds with MSG 4 which may include a contention resolution message. In contention-free random access the preamble is assigned to the UE and last two messages are skipped.

As noted above, the UE sends a preamble on a RACH occasion associated with a prior SSB transmission by the gNB. RACH procedures used for different purposes including initial access, synchronization, uplink scheduling request, beam-recovery, and the like. A RACH configuration of a cell typically specifies a number of SSB time indices per RACH time/frequency occasions (which could be one, less than one or greater than one).

In some cases, to speed access, a two-step RACH procedure may be supported. As the name implies, the two-step RACH procedure may effectively "collapse" the four messages of the four-step RACH procedure into two "enhanced" messages.

A first enhanced message (msgA) may be sent from a UE to a BS. In certain aspects, msgA includes some or all the information from MSG1 and MSG3 from the four-step RACH procedure, effectively combining MSG1 and MSG3. For example, msgA may include MSG1 and MSG3 multiplexed together such as using one of time-division multiplexing or frequency-division multiplexing. In certain aspects, msgA includes a RACH preamble for random access and a payload. The msgA payload, for example, may include the UE-ID and other signaling information (e.g., buffer status report (BSR)) or scheduling request (SR)). The BS may respond with a random access response (RAR) message (msgB) which may effectively combine MSG2 and MSG4 described above. For example, msgB may include the ID of the RACH preamble, a timing advance (TA), a back off indicator, a contention resolution message, UL/DL grant, and transmit power control (TPC) commands.

The techniques described herein for interference coordination may utilize both 4-step and 2-step RACH procedures and mechanisms.

Example Power Management Priority Handling in Integrated Access and Backhaul

Certain aspects of the present disclosure are directed to power management techniques for handling interference for integrated access and backhaul (IAB) networks. For example, a priority value may be configured for various IAB nodes, allowing the IAB nodes to determine whether to adjust transmission (TX) configurations in response to occurrence of interference, as described in more detail herein.

Figure 6A:
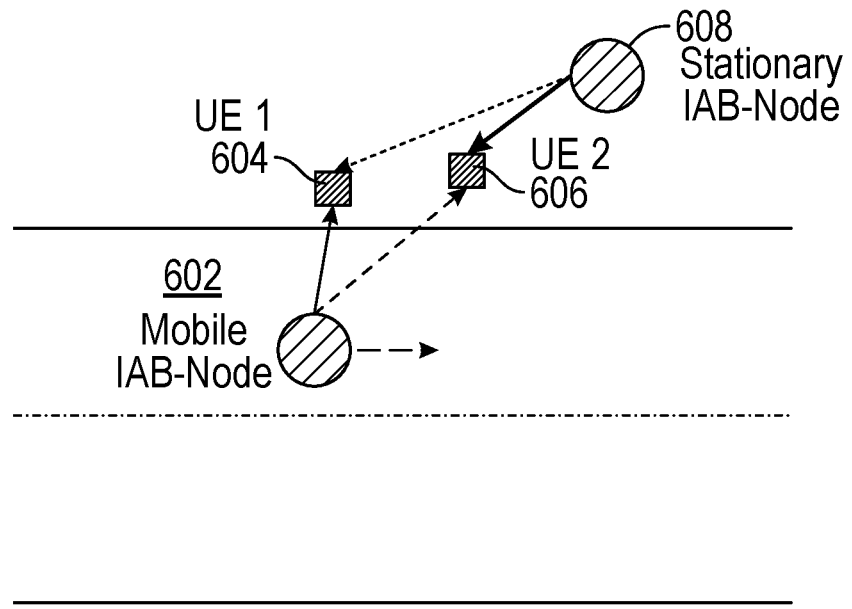
FIGS. 6A, 6B, 6C illustrate various communication systems showing difference interference scenarios.
Figure 6B:
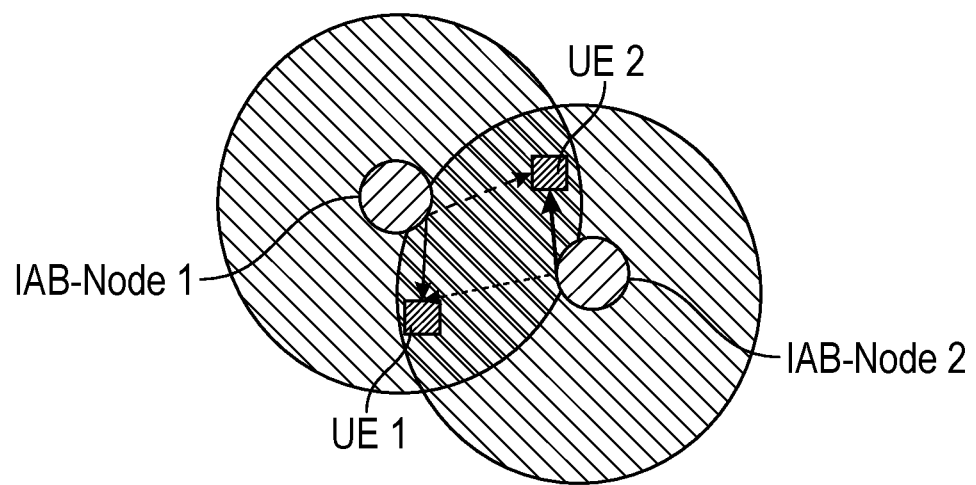
Figure 6C:
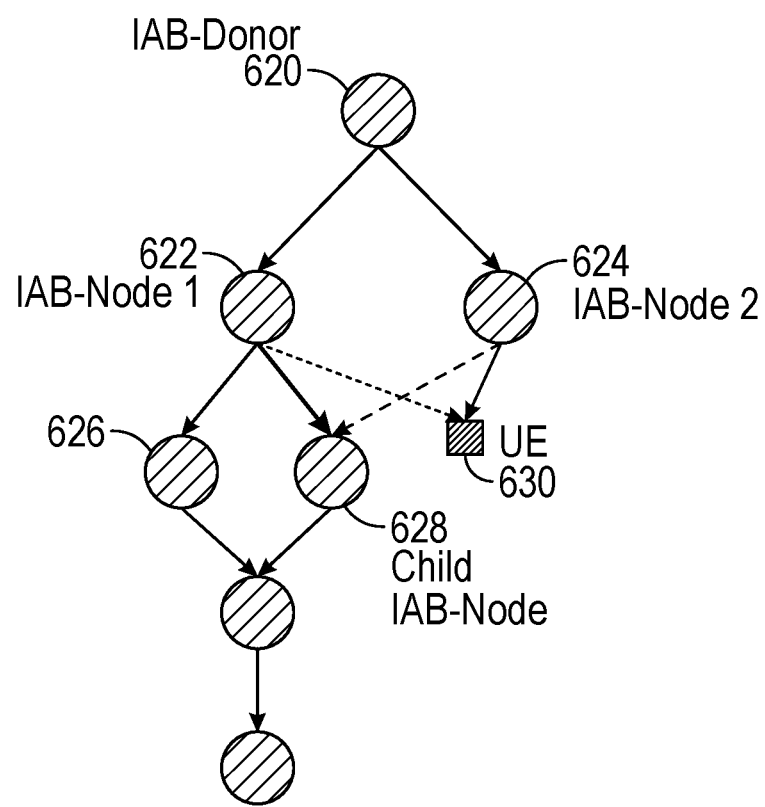

FIGS. 6A, 6B, 6C illustrate various communication systems showing difference interference scenarios in IAB networks. In certain aspects, IAB nodes (e.g., the MT of the IAB node) may perform signal measurements and may not have to rely on measurements done by UE. An IAB node has L2 functionality, therefore, any L3 measurements performed by a UE may be reported to a CU due to the split of CU and DU as described herein.

As illustrated in FIG. 6A, a mobile IAB-node 602 (e.g., an IAB-node on a vehicle) may be serving a UE 604. The mobile IAB-node 602 may transmit to a UE 604, yet cause interference to a UE 606 that is served by a stationary IAB node 608. Similarly, the transmission by the IAB-node 608 to the UE 606 may cause interference to the UE 604 being served by the mobile IAB-node 602. In this case, the mobile IAB-node 602, causing interference to the stationary IAB node 608, may reduce the downlink (DL) transmit power to the UE 604 to reduce the interference.

In an over deployed network, or zero-network planning scenario, as illustrated in FIG. 6B, multiple IAB nodes may have overlapping coverage, causing interference to each other. Therefore, tiebreaking rules may be used to determine which IAB node may reduce its DL transmit power, as described in more detail herein.

A multi-hop IAB implementation is illustrated in FIG. 6C. As illustrated, the IAB-donor 620 may serve IAB nodes 622, 624, the IAB node 624 may serve the UE 630, and the IAB node 622 may serve the child IAB nodes 626, 628. The transmission to the UE 630 from the IAB node 624 may be causing interference to the child IAB node 628. Moreover, the transmission to the child IAB node 628 by the IAB node 622 may cause interference to the UE 630. Certain aspects of the present disclosure provide techniques for determine which IAB-node is to yield (e.g., reduce its transmit power) in order to reduce the interference. For example, in such a scenario, the IAB node 624 may yield to IAB node 622 and reduces the DL transmit power to the UE 630. In other words, the backhaul (BH) link to the child IAB nodes 626, 628 may be favored over the access link between the IAB node 624 and the UE 630. Moreover, the IAB-node 622 has a higher load, and thus, may be prioritized for power management.

Certain aspects of the present disclosure are directed to an implementation of a power-management (PM) priority value that may be used for determining which of interfering IAB-nodes' DUs and/or child IAB-nodes' MTs (as well as child UEs) are to modify their respective DL TX configuration and UL TX configuration to reduce interference affecting the function of other nodes. As used herein, an IAB-node may also refer to an IAB-donor DU.

Example RACH Optimization for Over-the-Air Power Management Coordination in Integrated Access and Backhaul Aspects of the present disclosure provide techniques for interference coordination between wireless nodes, for example, of an Integrated Access and Backhaul (IAB) network.

As noted above, one potential challenge in IAB networks is how to address interference caused by transmissions of one node to other nodes. Aspects of the present disclosure leverage synchronization signal block (SSB) discovery and random access channel (RACH) mechanisms to provide interference coordination between (potentially interfering) wireless nodes of an IAB network. In some cases, the indication of interference coordination may be used as an efficient mechanism to share power management priority values of (child/parent) nodes, used to determine which nodes should adjust their transmission (TX) configurations in an effort to reduce interference to other nodes.

One advantage to utilizing existing mechanisms for interference coordination is that certain procedures may be re-used or modified for efficient implementation. Another advantage of using discovery and RACH mechanisms for interference coordination is that by monitoring for directional SSB transmissions to detect another (potentially interfering node), corresponding RACH occasions may be used to provide an indication of interference coordination to the other node. Due to the association of RACH occasions to SSB transmissions, the other node knows what resources to monitor for the indication, when, and in what direction (as the other node is already monitoring those resources for RACH transmissions).

Figure 7:
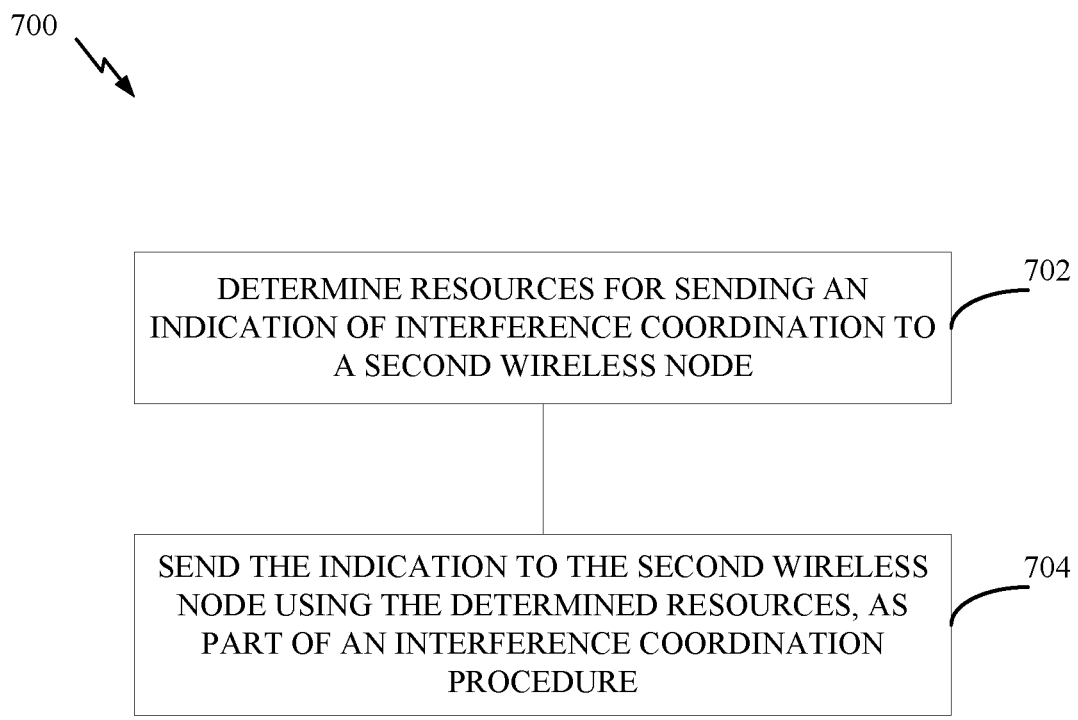
FIG. 7 illustrates a flow diagram illustrating example operations for wireless communication, in accordance with various aspects of the disclosure.

FIG. 7 is a flow diagram illustrating example operations 700 for wireless communication by a first wireless node, in accordance with certain aspects of the present disclosure.

The operations 700 may be performed by a first wireless node, such as an IAB-node (e.g., IAB-node B in FIGS. 9A and 9B).

Operations 700 may be implemented as software components that are executed and run on one or more processors (e.g., controller/processors shown in FIG. 2). Further, the transmission and reception of signals by the first wireless communication device in operations 700 may be enabled, for example, by one or more antennas (e.g., antennas of FIG. 2). In certain aspects, the transmission and/or reception of signals by the first wireless communication device may be implemented via a bus interface of one or more processors (e.g., controller/processors shown in FIG. 2) obtaining and/or outputting signals.

Operations 700 begin, at 702, by determining resources for sending an indication of interference coordination to a second wireless node. As will be described in greater detail below, the determination may be based on resources (e.g., a RACH occasion) associated with an SSB detected from the second wireless node or based on an SSB transmission configuration (STC).

At 704, the first wireless node sends the indication to the second wireless node using the determined resources, as part of an interference coordination procedure. For example, the first wireless node may send the indication via a RACH transmission (in a RACH occasion associated with a detected SSB) or via an SSB transmission (based on a received STC).

Figure 8:
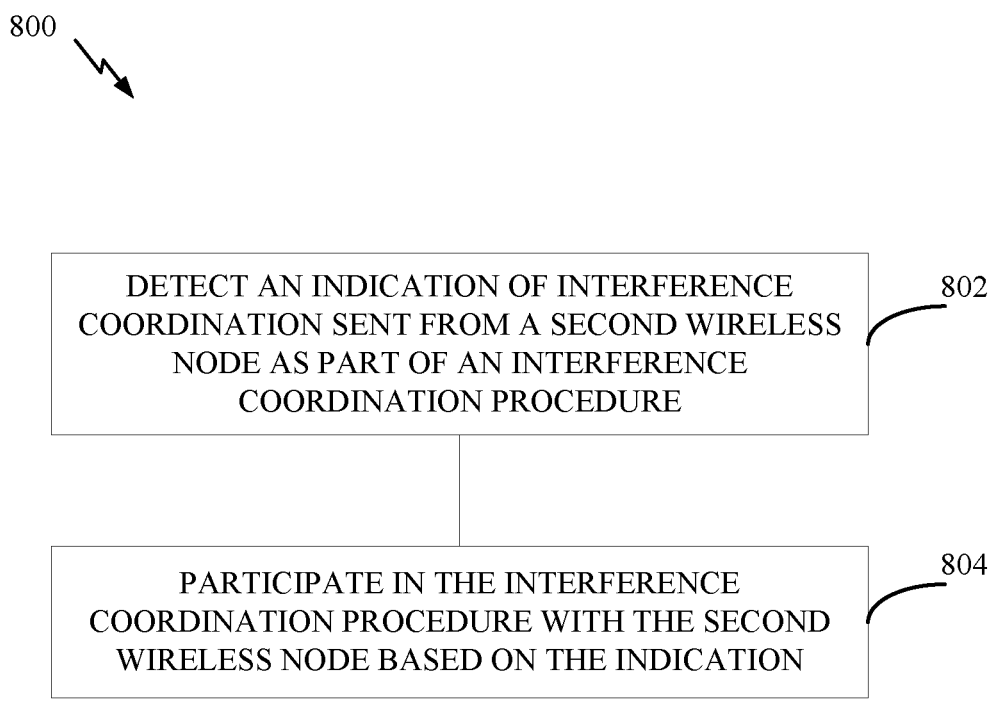
FIG. 8 illustrates a flow diagram illustrating example operations for wireless communication, in accordance with various aspects of the disclosure.

FIG. 8 is a flow diagram illustrating example operations 800 for wireless communication by a first wireless node, in accordance with certain aspects of the present disclosure. Operations 800 may be considered complementary to operations 700 of FIG. 7. For example, operations 800 may be performed by an IAB node (e.g., IAB-node A in FIGS. 9A and 9B) to receive and process an indication of interference coordination from another IAB node (e.g., IAB-node B in FIGS. 9A and 9B) performing operations 700 described above.

As with operations 700, operations 800 may be implemented as software components that are executed and run on one or more processors (e.g., controller/processors shown in FIG. 2). Further, the transmission and reception of signals by the first wireless communication device in operations 800 may be enabled, for example, by one or more antennas (e.g., antennas of FIG. 2). In certain aspects, the transmission and/or reception of signals by the first wireless communication device may be implemented via a bus interface of one or more processors (e.g., controller/processors shown in FIG. 2) obtaining and/or outputting signals.

Operations 800 begin, at 802, by detecting an indication of interference coordination sent from a second wireless node as part of an interference coordination procedure. As noted above, the indication may be detected as a RACH transmission or an SSB transmission from the second wireless node.

At 804, the first wireless node participates in the interference coordination procedure with the second wireless node based on the indication. As will be described below, participating in the interference coordination procedure may involve conveying a power management priority level of the second wireless node (or child node thereof) and/or modifying transmission configurations of the first wireless node (or child node thereof) in an effort to reduce interference.

Operations 700 and 800 of FIGS. 7 and 8 may be understood with reference to FIGS. 9A and 9B, which illustrate one example mechanism for signaling an indication of interference coordination via a RACH transmission.

As illustrated in FIG. 9A, an IAB-node B detects an SSB transmission from a neighboring IAB-node A. Based on the detection, IAB-node B may determine IAB-node A is causing (or could potentially cause) interference. As noted above, each SSB may have a corresponding RACH occasion, defining time-frequency resources IAB-node A will monitor for sending a RACH transmission. IAB-node B may identify the corresponding RACH occasion from a broadcast message (e.g., SIB1).

As illustrated in FIG. 9B, IAB-node B may send a RACH transmission in the RACH occasion corresponding to the SSB transmission detected in FIG. 9A. The RACH transmission based indication may be sent using a RACH MSG 1 (RACH preamble) or a RACH MSG 3. While not shown, in other cases, IAB-node B may send an SSB-based indication, for example, using an IAB inter-node discovery SSB.

Using the RACH occasion corresponding to the detected SSB transmission to send the indication of interference coordination may provide some level of assurance that IAB-node B will use the right TX beam and at a time IAB-node A will be listening for a RACH (and with the right RX beam).

Another advantage to the approach using SSB and RACH mechanisms to convey an indication of interference coordination is that it does not involve the CU. Further, using a RACH message (or SSB transmission) for interference coordination eliminates the need to establish a link between IAB-node A and IAB-node B (which is typically restricted to a parent-child relationship).

As noted above, in some cases, power management (PM) priority levels may be assigned to IAB nodes. How an IAB node responds to an indication of interference coordination may depend on corresponding PM priority levels. As noted above, PM priority levels may be used for determining which of interfering IAB-nodes' DUs and/or child IAB-nodes' MTs (as well as child UEs) are to modify their respective DL TX configuration and UL TX configuration to reduce interference affecting the function of other nodes.

In some cases, the interference coordination indication techniques described herein may be used to convey information regarding PM priority levels (e.g., of an IAB node sending the indication and/or child nodes thereof) or to prompt IAB nodes to convey their PM priority levels.

For example, referring again to FIGS. 9A and 9B, IAB-node B might know that it has higher priority over IAB-node A, but may not be sure that IAB-node A knows this. As another example, IAB-node B may not know the PM priority level of IAB-node A. In some cases, there may be no notion of PM priority level at the nodes (e.g., PM priority levels are not assigned/used or not supported). In some cases, IAB-node B may actually measure interference from IAB-node A.

In some cases, a first wireless node may request that a second wireless node send an indication to a third node for interference coordination. For example, the first wireless node may be a DU and the second wireless node may be a child MT (or UE).

The content or information conveyed via an indication of interference coordination may vary. As noted above, the indication may carry an indication of interference (e.g., based on actual interference measured/detected by a node).

In some case, the indication may convey a channel quality metric. For example, the indication may convey a reference signal received power (RSRP) measured by a node sending the indication. As another example, the indication may provide (or be used to generate) an estimate of path loss (PL), for example, based on a signal power received by a second wireless node.

As noted above, in some cases, the indication may be used to provide a PM priority level(s) of the IAB-node sending the indication. In some cases, the indication may provide an ID of the IAB-node (e.g. ID assigned by core network) or one or more cells (e.g. PCI) served by the IAB-node DU.

The indication may also carry assistance ("helper") information that an IAB-node receiving the indication may use to determine how to modify its own transmission (TX) configuration or the TX configuration of a child MT/UE of the IAB-node. As used herein, a TX configuration may refer to various configurations that aim to reduce interference, such as TX power or power range, periodicity of transmission, number of TX occasions per period (duty cycle), frequency domain resources (e.g. resource blocks (RBs)/bandwidth parts (BWPs) used for communication, beam sweep configuration for measurement reference signal (RS)/broadcast signals and messages (e.g., number of beams and beam shape), beam configuration for control/data communication (e.g., beam width), or any combination thereof. For example, the TX power of a specific signal/channel/resource may be set using the TX configuration since it may be important to have selective power profile for a more flexible power control.

As an example of assistance information, a first IAB-node may indicate, via an indication, information that a second IAB-node may use to perform power back-off (generally referring to a reduction of maximum transmission power). For example, the assistance information may indicate the second IAB-node is to back-off power by X dB, or back-off by X dB and Y dB on beam-directions that are quasi co-located with certain SSB indices (e.g., 1 and 3, respectively).

A first wireless node may send one or multiple indications to a second wireless node. The indications may be explicit, for example, as payload of a RACH MSG 3. In other cases, the indication may be implicit.

An implicit indication may be encoded by the resources over which the one or more indications are transmitted. In some cases, special RACH resources/occasions may be reserved for indicating interference coordination. For example, a first IAB-node may send a second IAB-node a RACH preamble (MSG1) on one RACH occasion and send another preamble on a second RACH occasion corresponding to two beam directions on which the second IAB-node transmitted SSBs detected by the first IAB node.

In some cases, an implicit indication may be encoded by a TX configuration (as described above) for sending the indication(s). For example, a first IAB node may send a second IAB-node a MSG 1 (RACH preamble) with a different power configuration, such that the received power is X dB above the target received power (which may be indicated in the RACH configuration carried in SIB1 transmitted by second IAB-node). In other words, a RACH preamble detected at a higher than expected target received power may be interpreted as an indication of interference coordination (rather than a normal RACH).

In some cases, an implicit indication may be encoded by the structure of the transmitted signal (conveying the indication). For example, a specific RACH preamble format or combination of formats may be used to indicate interference indication. The preamble format may be defined by parameters such as a generating root index, cyclic shift, preamble length, numerology, or timing.

Upon receiving an indication of interference coordination, a second IAB-node may take various actions to participate in the interference coordination procedure. For example, the second IAB node may modify a TX configuration (defined previously) of its DU or one or more child nodes (e.g., an MT or UE). In some cases, the second IAB node may send or instruct a child node to send one or more PM priority levels (e.g., of the second IAB node or a child node) to the first IAB-node (or the CU) directly or in a broadcast message (e.g., a SIB1).

In some cases, upon receiving an indication of interference coordination, the second IAB node may send IDs of one or more cells of the first IAB-node DU or an identifier of the first IAB-node to the CU. These IDs may allow the CU to perform interference coordination with first IAB-node or to request additional information about the first IAB-node. In some cases, the second IAB-node may send such IDs to a child node (MT/UE), for example, as a request to perform measurements for indicated PCIS.

In some cases, how a node transmits an indication of interference coordination, detects an indication, or takes action in response to an indication may be configured. For example, the configuration for transmitting an indication or taking action upon receiving an indication may be indicated by the CU via radio resource control (RRC) signaling or via an F1 application protocol (F1AP) message.

As noted above, one potential challenge in IAB networks is how to address interference caused by transmissions of one node to other nodes. Aspects of the present disclosure leverage synchronization signal block (SSB) discovery and random access channel (RACH) mechanisms to provide interference coordination between (potentially interfering) wireless nodes of an IAB network. In some cases, the indication of interference coordination may be used as an efficient mechanism to share power management priority values of (child/parent) nodes, used to determine which nodes should adjust their transmission (TX) configurations in an effort to reduce interference to other nodes.

One advantage to utilizing existing mechanisms for interference coordination is that certain procedures may be re-used or modified for efficient implementation. Another advantage of using discovery and RACH mechanisms for interference coordination is that by monitoring for directional SSB transmissions to detect another (potentially interfering node), corresponding RACH occasions may be used to provide an indication of interference coordination to the other node. Due to the association of RACH occasions to SSB transmissions, the other node knows what resources to monitor for the indication, when, and in what direction (as the other node is already monitoring those resources for RACH transmissions).

As described herein, aspects of the present disclosure leverage synchronization signal block (SSB) discovery and random access channel (RACH) mechanisms to provide interference coordination between (potentially interfering) wireless nodes of an IAB network. Utilizing existing mechanisms for interference coordination in this manner may lead to efficient implementation, for example, allowing certain existing procedures to be re-used or re-purposed for indicating interference coordination between nodes without the need for an established connection (and without the need for CU involvement).

In addition to the various aspects described above, aspects of specific combinations are within the scope of the disclosure, some of which are detailed below:

Aspect 1: A method for wireless communications by a first wireless node, comprising: determining resources for sending an indication of interference coordination to a second wireless node; and sending the indication to the second wireless node using the determined resources, as part of an interference coordination procedure.

Aspect 2: The method of Aspect 1, wherein: the determination is based on a synchronization signal block (SSB) transmission configuration (STC); and the indication is sent via an SSB transmission from the first wireless node in accordance with the STC.

Aspect 3: The method of Aspect 2, wherein the SSB transmission is sent within a window, defined by the STC, that aligns with an SSB measurement timing configuration (SMTC) window of the second wireless node.

Aspect 4: The method of any of Aspects 1-3, wherein the indication is designed to prompt the second wireless node to communicate with a third wireless node as part of the interference coordination procedure.

Aspect 5: The method of any of Aspects 1-4, wherein the determination is based on: detecting a first synchronization signal block (SSB) from the second wireless node; and identifying at least one first random access channel (RACH) occasion associated with the first SSB.

Aspect 6: The method of Aspect 5, wherein the at least one first RACH occasion is identified based on a RACH configuration broadcast by the second wireless node.

Aspect 7: The method of any of Aspects 1-6, wherein the indication is implicitly sent via a transmit power configuration used to send a RACH preamble.

Aspect 8: The method of Aspect 7, wherein the RACH preamble is sent with a transmit power setting designed such that the RACH preamble will be received above a target received power indicated in the RACH configuration.

Aspect 9: The method of any of Aspects 1-8, wherein the indication is explicitly sent via a payload of a RACH message.

Aspect 10: The method of Aspect 5, wherein the indication is implicitly sent via at least one of: the identified at least one first RACH occasion; or the resources used to send the indication.

Aspect 11: The method of Aspect 5, further comprising: detecting a second SSB transmitted from the second wireless node; identifying a second RACH occasion associated with the second SSB; and using resources of the second RACH occasion to send a second indication to the second wireless node as part of the interference coordination procedure.

Aspect 12: The method of any of Aspects 1-11, wherein the second indication is sent via at least one of: a RACH preamble format; or a combination of different RACH preamble formats.

Aspect 13: The method of Aspect 12, wherein the second indication is sent via at least one of a root index, cyclic shift, preamble length, numerology, or timing of the RACH preamble format.

Aspect 14: The method of Aspect 5, wherein the indication conveys at least one of: a channel quality metric between the first wireless node and the second wireless node; or an estimate of path loss (PL) between the first wireless node and the second wireless node, in a direction associated with the first SSB.

Aspect 15: The method of any of Aspects 1-14, wherein the indication conveys at least one of: a power management priority level of the first wireless node; an ID of the first wireless node or of one or more cells served by the first wireless node; or assistance information indicating how the second wireless node can modify a transmission configuration associated with communications by the second wireless node.

Aspect 16: The method of Aspect 15, wherein the transmission configuration indicates at least one of a transmission power or power range, a periodicity of transmissions, a number of transmission occasions per period, frequency domain resources, or a beam configuration.

Aspect 17: The method of Aspect 5, wherein the indication requests that the second wireless node to perform a power backoff in at least a direction associated with the first SSB.

Aspect 18: The method of any of Aspects 1-17, further comprising receiving a configuration for sending the indication via at least one of radio resource control (RRC) signaling or an application protocol message.

Aspect 19: A method for wireless communications by a first wireless node, comprising: detecting an indication of interference coordination sent from a second wireless node as part of an interference coordination procedure; and participating in the interference coordination procedure with the second wireless node based on the indication.

Aspect 20: The method of Aspect 19, wherein the indication is detected via a synchronization signal block (SSB) transmission from the second wireless node.

Aspect 21: The method of Aspect 20, wherein the SSB transmission is detected within an SSB measurement timing configuration (SMTC) window of the first wireless node that aligns with an SSB transmission configuration (STC) window of the second wireless node.

Aspect 22: The method of any of Aspects 19-21, wherein the participation comprises communicating with a third wireless node.

Aspect 23: The method of any of Aspects 19-22, further comprising: transmitting synchronization signal blocks (SSBs) in different directions, wherein the indication is sent from the second wireless node using resources of at least one first random access channel (RACH) occasion associated with a first SSB of the SSBs.

Aspect 24: The method of Aspect 23, further comprising broadcasting a RACH configuration defining the at least one first RACH occasion.

Aspect 25: The method of any of Aspects 19-24, wherein the indication is detected based on a transmit power configuration used by the second wireless node to send a RACH preamble.

Aspect 26: The method of Aspect 25, wherein the RACH preamble is detected with a received power above a target received power indicated in the RACH configuration.

Aspect 27: The method of any of Aspects 19-26, wherein the indication is detected via a payload of a RACH message.

Aspect 28: The method of Aspect 23, wherein the indication is detected based on at least one of: the at least one first RACH occasion in which the indication is sent; or the resources used to send the indication.

Aspect 29: The method of Aspect 23, further comprising: detecting, from the second wireless node, a second indication sent as part of the interference coordination procedure using resources of at least one second RACH occasion associated with a second SSB of the SSBs.

Aspect 30: The method of Aspect 23, wherein the indication is detected based on at least one of: a RACH preamble format; or a combination of different RACH preamble formats.

Aspect 31: The method of Aspect 30, wherein the different RACH preamble formats may differ by at least one of a root index, cyclic shift, preamble length, numerology, or timing of the RACH preamble.

Aspect 32: The method of Aspect 23, wherein the indication conveys at least one of: a channel quality metric between the first wireless node and the second wireless node; or an estimate of path loss (PL) between the first wireless node and the second wireless node, in a direction associated with the first SSB.

Aspect 33: The method of any of Aspects 19-32, wherein the indication conveys at least one of: a power management priority level of the second wireless node; an ID of the second wireless node or of one or more cells served by the second wireless node; or assistance information indicating how the first wireless node can modify a transmission configuration associated with communications by the first wireless node.

Aspect 34: The method of Aspect 33, wherein the transmission configuration indicates at least one of a transmission power or power range, a periodicity of transmissions, a number of transmission occasions per period, frequency domain resources, or a beam configuration.

Aspect 35: The method of Aspect 23, wherein: the indication requests that the first wireless node to perform a power backoff in at least a direction associated with the first SSB; and the participation comprises performing the power backoff.

Aspect 36. The method of Aspect 33, wherein the participation comprises at least one of: modifying the transmission configuration of at least one of a distributed unit (DU) of the first wireless node or a child node of the first wireless node; sending one or more power management priority levels of the first wireless node or the child node of the first wireless node to the second wireless node or a centralized unit (CU); instructing the child node of the first wireless node to send, the one or more power management priority levels of the first wireless node or the child node of the first wireless node, to the second wireless node or the centralized unit (CU); sending the one or more power management priority levels of the first wireless node or the child node of the first wireless node in a broadcast message; or sending the ID of the second wireless node or of the one or more cells served by the second wireless node to the CU or the child node of the first wireless node.

Aspect 37: The method of any of Aspects 19-36, further comprising receiving a configuration for detecting the indication via at least one of radio resource control (RRC) signaling or an application protocol message.

Aspect 38. An apparatus for wireless communications by a first wireless node, comprising: means for determining resources for sending an indication of interference coordination to a second wireless node; and means for sending the indication to the second wireless node using the determined resources, as part of an interference coordination procedure.

Aspect 39: The apparatus of Aspect 38, wherein: the determination is based on a synchronization signal block (SSB) transmission configuration (STC); and the indication is sent via an SSB transmission from the first wireless node in accordance with the STC.

Aspect 40: The apparatus of Aspect 39, wherein the SSB transmission is sent within a window, defined by the STC, that aligns with an SSB measurement timing configuration (SMTC) window of the second wireless node.

Aspect 41: The apparatus of any of Aspects 38-40, wherein the indication is designed to prompt the second wireless node to communicate with a third wireless node as part of the interference coordination procedure.

Aspect 42: The apparatus of any Aspects 38-41, wherein the determination means comprises: means for detecting a first synchronization signal block (SSB) from the second wireless node; and means for identifying at least one first random access channel (RACH) occasion associated with the first SSB.

Aspect 43: The apparatus of Aspect 42, wherein the at least one first RACH occasion is identified based on a RACH configuration broadcast by the second wireless node.

Aspect 44: The apparatus of any of Aspects 38-43, wherein the indication is implicitly sent via a transmit power configuration used to send a RACH preamble.

Aspect 45: The apparatus of Aspect 44, wherein the RACH preamble is sent with a transmit power setting designed such that the RACH preamble will be received above a target received power indicated in the RACH configuration.

Aspect 46: The apparatus of any of Aspects 38-45, wherein the indication is explicitly sent via a payload of a RACH message.

Aspect 47: The apparatus of Aspect 42, wherein the indication is implicitly sent via at least one of: the identified at least one first RACH occasion; or the resources used to send the indication.

Aspect 48. The apparatus of Aspect 42, further comprising: means for detecting a second SSB transmitted from the second wireless node; means for identifying a second RACH occasion associated with the second SSB; and means for using resources of the second RACH occasion to send a second indication to the second wireless node as part of the interference coordination procedure.

Aspect 49: The apparatus of Aspect 48, wherein the second indication is sent via at least one of: a RACH preamble format; or a combination of different RACH preamble formats.

Aspect 50: The apparatus of Aspect 49, wherein the second indication is sent via at least one of a root index, cyclic shift, preamble length, numerology, or timing of the RACH preamble format.

Aspect 51: The apparatus of Aspect 42, wherein the indication conveys at least one of: a channel quality metric between the first wireless node and the second wireless node; or an estimate of path loss (PL) between the first wireless node and the second wireless node, in a direction associated with the first SSB.

Aspect 52: The apparatus of any of Aspects 38-51, wherein the indication conveys at least one of: a power management priority level of the first wireless node; an ID of the first wireless node or of one or more cells served by the first wireless node; or assistance information indicating how the second wireless node can modify a transmission configuration associated with communications by the second wireless node.

Aspect 53: The apparatus of Aspect 52, wherein the transmission configuration indicates at least one of a transmission power or power range, a periodicity of transmissions, a number of transmission occasions per period, frequency domain resources, or a beam configuration.

Aspect 54: The apparatus of Aspect 42, wherein the indication requests that the second wireless node to perform a power backoff in at least a direction associated with the first SSB.

Aspect 55: The apparatus of any of Aspects 38-54, further comprising means for outputting a configuration for sending the indication via at least one of radio resource control (RRC) signaling or an application protocol message.

Aspect 56: An apparatus for wireless communications by a first wireless node, comprising: means for detecting an indication of interference coordination sent from a second wireless node as part of an interference coordination procedure; and means for participating in the interference coordination procedure with the second wireless node based on the indication.

Aspect 57: The apparatus of Aspect 56, wherein the indication is detected via a synchronization signal block (SSB) transmission from the second wireless node.

Aspect 58: The apparatus of Aspect 57, wherein the SSB transmission is detected within an SSB measurement timing configuration (SMTC) window of the first wireless node that aligns with an SSB transmission configuration (STC) window of the second wireless node.

Aspect 59: The apparatus of any of Aspects 56-58, wherein the participation means comprises means for communicating with a third wireless node.

Aspect 60: The apparatus of any of Aspects 56-59, further comprising means for outputting synchronization signal blocks (SSBs) for transmission in different directions, wherein the indication is sent from the second wireless node using resources of at least one first random access channel (RACH) occasion associated with a first SSB of the SSBs.

Aspect 61: The apparatus of Aspect 60, further comprising means for outputting a RACH configuration defining the at least one first RACH occasion for broadcasting.

Aspect 62: The apparatus of any of Aspects 56-61, wherein the indication is detected based on a transmit power configuration used by the second wireless node to send a RACH preamble.

Aspect 63: The apparatus of Aspect 62, wherein the RACH preamble is detected with a received power above a target received power indicated in the RACH configuration.

Aspect 64: The apparatus of any of Aspects 56-63, wherein the indication is detected via a payload of a RACH message.

Aspect 65: The apparatus of Aspect 60, wherein the indication is detected based on at least one of: the at least one first RACH occasion in which the indication is sent; or the resources used to send the indication.

Aspect 66: The apparatus of Aspect 60, further comprising means for detecting, from the second wireless node, a second indication sent as part of the interference coordination procedure using resources of at least one second RACH occasion associated with a second SSB of the SSBs.

Aspect 67: The apparatus of Aspect 60, wherein the indication is detected based on at least one of: a RACH preamble format; or a combination of different RACH preamble formats.

Aspect 68: The apparatus of Aspect 67, wherein the different RACH preamble formats may differ by at least one of a root index, cyclic shift, preamble length, numerology, or timing of the RACH preamble.

Aspect 69: The apparatus of Aspect 60, wherein the indication conveys at least one of: a channel quality metric between the first wireless node and the second wireless node; or an estimate of path loss (PL) between the first wireless node and the second wireless node, in a direction associated with the first SSB.

Aspect 70: The apparatus of any of Aspects 56-69, wherein the indication conveys at least one of: a power management priority level of the second wireless node; an ID of the second wireless node or of one or more cells served by the second wireless node; or assistance information indicating how the first wireless node can modify a transmission configuration associated with communications by the first wireless node.

Aspect 71: The apparatus of Aspect 70, wherein the transmission configuration indicates at least one of a transmission power or power range, a periodicity of transmissions, a number of transmission occasions per period, frequency domain resources, or a beam configuration.

Aspect 72: The apparatus of Aspect 60, wherein: the indication requests that the first wireless node to perform a power backoff in at least a direction associated with the first SSB; and the participation comprises performing the power backoff.

Aspect 73: The apparatus of Aspect 70, wherein the participation means comprises at least one of: means for modifying the transmission configuration of at least one of a distributed unit (DU) of the first wireless node or a child node of the first wireless node; means for outputting one or more power management priority levels of the first wireless node or the child node of the first wireless node for transmission to the second wireless node or a centralized unit (CU); means for instructing the child node of the first wireless node to send, the one or more power management priority levels of the first wireless node or the child node of the first wireless node, to the second wireless node or the centralized unit (CU); means for outputting the one or more power management priority levels of the first wireless node or the child node of the first wireless node for transmission in a broadcast message; or means for outputting the ID of the second wireless node or of the one or more cells served by the second wireless node for transmission to the CU or the child node of the first wireless node.

Aspect 74: The apparatus of any of Aspects 56-73, further comprising means for obtaining a configuration for detecting the indication via at least one of radio resource control (RRC) signaling or an application protocol message.

Aspect 75: An apparatus for wireless communications by a first wireless node, comprising: a processing system configured to determine resources for sending an indication of interference coordination to a second wireless node; and an interface configured to output the indication for transmission to the second wireless node using the determined resources, as part of an interference coordination procedure.

Aspect 76: The apparatus of Aspect 75, wherein the determination is based on a synchronization signal block (SSB) transmission configuration (STC); and the indication is sent via an SSB transmission from the first wireless node in accordance with the STC.

Aspect 77: The apparatus of any of Aspect 76, wherein the SSB transmission is sent within a window, defined by the STC, that aligns with an SSB measurement timing configuration (SMTC) window of the second wireless node.

Aspect 78: The apparatus of any of Aspects 75-77, wherein the indication is designed to prompt the second wireless node to communicate with a third wireless node as part of the interference coordination procedure.

Aspect 79: The apparatus of any of Aspects 75-78, wherein the determination is based on: detecting a first synchronization signal block (SSB) from the second wireless node; and identifying at least one first random access channel (RACH) occasion associated with the first SSB.

Aspect 80: The apparatus of Aspect 79, wherein the at least one first RACH occasion is identified based on a RACH configuration broadcast by the second wireless node.

Aspect 81: The apparatus of any of Aspects 75-80, wherein the indication is implicitly sent via a transmit power configuration used to send a RACH preamble.

Aspect 82: The apparatus of Aspect 81, wherein the RACH preamble is sent with a transmit power setting designed such that the RACH preamble will be received above a target received power indicated in the RACH configuration.

Aspect 83: The apparatus of any of Aspects 75-82, wherein the indication is explicitly sent via a payload of a RACH message.

Aspect 84: The apparatus of Aspect 79, wherein the indication is implicitly sent via at least one of: the identified at least one first RACH occasion; or the resources used to send the indication.

Aspect 85: The apparatus of Aspect 79, wherein the processing system is further configure to: detect a second SSB transmitted from the second wireless node; identify a second RACH occasion associated with the second SSB; and use resources of the second RACH occasion to send a second indication to the second wireless node as part of the interference coordination procedure.

Aspect 86: The apparatus of any of Aspects 75-85, wherein the second indication is sent via at least one of: a RACH preamble format; or a combination of different RACH preamble formats.

Aspect 87: The apparatus of Aspect 86, wherein the second indication is sent via at least one of a root index, cyclic shift, preamble length, numerology, or timing of the RACH preamble format.

Aspect 88: The apparatus of Aspect 79, wherein the indication conveys at least one of: a channel quality metric between the first wireless node and the second wireless node; or an estimate of path loss (PL) between the first wireless node and the second wireless node, in a direction associated with the first SSB.

Aspect 89: The apparatus of any of Aspects 75-88, wherein the indication conveys at least one of: a power management priority level of the first wireless node; an ID of the first wireless node or of one or more cells served by the first wireless node; or assistance information indicating how the second wireless node can modify a transmission configuration associated with communications by the second wireless node.

Aspect 90: The apparatus of Aspect 89, wherein the transmission configuration indicates at least one of a transmission power or power range, a periodicity of transmissions, a number of transmission occasions per period, frequency domain resources, or a beam configuration.

Aspect 91: The apparatus of Aspect 79, wherein the indication requests that the second wireless node to perform a power backoff in at least a direction associated with the first SSB.

Aspect 92: The apparatus of any of Aspects 75-91, further comprising an interface configured to obtain a configuration for sending the indication via at least one of radio resource control (RRC) signaling or an application protocol message.

Aspect 93: An apparatus for wireless communications by a first wireless node, comprising: a processing system configured to: detect an indication of interference coordination sent from a second wireless node as part of an interference coordination procedure; and participate in the interference coordination procedure with the second wireless node based on the indication.

Aspect 94: The apparatus of Aspect 93, wherein the indication is detected via a synchronization signal block (SSB) transmission from the second wireless node.

Aspect 95: The apparatus of Aspect 94, wherein the SSB transmission is detected within an SSB measurement timing configuration (SMTC) window of the first wireless node that aligns with an SSB transmission configuration (STC) window of the second wireless node.

Aspect 96: The apparatus of any of Aspects 93-95, wherein the participation comprises communicating with a third wireless node.

Aspect 97: The apparatus of any of Aspects 93-96, further comprising: an interface configured to output synchronization signal blocks (SSBs) for transmission in different directions, wherein the indication is sent from the second wireless node using resources of at least one first random access channel (RACH) occasion associated with a first SSB of the SSBs.

Aspect 98: The apparatus of Aspect 97, wherein the interface is further configured to output a RACH configuration defining the at least one first RACH occasion for broadcasting.

Aspect 99: The apparatus of any of Aspects 93-98, wherein the indication is detected based on a transmit power configuration used by the second wireless node to send a RACH preamble.

Aspect 100: The apparatus of Aspect 99, wherein the RACH preamble is detected with a received power above a target received power indicated in the RACH configuration.

Aspect 101: The apparatus of any of Aspects 93-100, wherein the indication is detected via a payload of a RACH message.

Aspect 102: The apparatus of Aspect 97, wherein the indication is detected based on at least one of: the at least one first RACH occasion in which the indication is sent; or the resources used to send the indication.

Aspect 103: The apparatus of Aspect 97, wherein the processing system is further configured to detect, from the second wireless node, a second indication sent as part of the interference coordination procedure using resources of at least one second RACH occasion associated with a second SSB of the SSBs.

Aspect 104: The apparatus of any of Aspects 93-103, wherein the indication is detected based on at least one of: a RACH preamble format; or a combination of different RACH preamble formats.

Aspect 105: The apparatus of Aspect 104, wherein the different RACH preamble formats may differ by at least one of a root index, cyclic shift, preamble length, numerology, or timing of the RACH preamble.

Aspect 106: The apparatus of Aspect 97, wherein the indication conveys at least one of: a channel quality metric between the first wireless node and the second wireless node; or an estimate of path loss (PL) between the first wireless node and the second wireless node, in a direction associated with the first SSB.

Aspect 107: The apparatus of any of Aspects 93-106, wherein the indication conveys at least one of: a power management priority level of the second wireless node; an ID of the second wireless node or of one or more cells served by the second wireless node; or assistance information indicating how the first wireless node can modify a transmission configuration associated with communications by the first wireless node.

Aspect 108: The apparatus of Aspect 107, wherein the transmission configuration indicates at least one of a transmission power or power range, a periodicity of transmissions, a number of transmission occasions per period, frequency domain resources, or a beam configuration.

Aspect 109: The apparatus of Aspect 97, wherein: the indication requests that the first wireless node to perform a power backoff in at least a direction associated with the first SSB; and the participation comprises performing the power backoff.

Aspect 110: The apparatus of Aspect 107, wherein the participation comprises at least one of: modifying the transmission configuration of at least one of a distributed unit (DU) of the first wireless node or a child node of the first wireless node; providing one or more power management priority levels of the first wireless node or the child node of the first wireless node for transmission to the second wireless node or a centralized unit (CU); instructing the child node of the first wireless node to send, the one or more power management priority levels of the first wireless node or the child node of the first wireless node, to the second wireless node or the centralized unit (CU); providing the one or more power management priority levels of the first wireless node or the child node of the first wireless node in for transmission a broadcast message; or providing the ID of the second wireless node or of the one or more cells served by the second wireless node for transmission to the CU or the child node of the first wireless node.

Aspect 111: The apparatus of any of Aspects 93-110, further comprising an interface configured to obtain a configuration for detecting the indication via at least one of radio resource control (RRC) signaling or an application protocol message.

Aspect 112: A first wireless node, comprising: a processing system configured to determine resources for sending an indication of interference coordination to a second wireless node; and a transmitter configured to transmit the indication to the second wireless node using the determined resources, as part of an interference coordination procedure.

Aspect 113: A first wireless node, comprising: at least one antenna; and a processing system configured to detect, via the at least one antenna, an indication of interference coordination sent from a second wireless node as part of an interference coordination procedure; and participate in the interference coordination procedure with the second wireless node based on the indication.

Aspect 114: A computer-readable medium for wireless communications comprising codes executable to: determine resources for sending an indication of interference coordination to a second wireless node; and output the indication for transmission to the second wireless node using the determined resources, as part of an interference coordination procedure.

115. A computer-readable medium for wireless communications comprising codes executable to: detect an indication of interference coordination sent from a second wireless node as part of an interference coordination procedure; and participate in the interference coordination procedure with the second wireless node based on the indication.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UNITS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components. For example, processors 266, 258, 264, and/or controller/processor 280 of the UE 120 and/or processors 220, 230, 238, and/or controller/processor 240 of the BS 110 shown in FIG. 2 may be configured to perform operations 700 and 800 of FIGS. 7 and 8, respectively.

Means for receiving may include a receiver (such as one or more antennas or receive processors) illustrated in FIG. 2. Means for transmitting or means for sending may include a transmitter (such as one or more antennas or transmit processors) illustrated in FIG. 2. Means for determining, means for detecting, means for identifying, means for using, means for participating, means for communicating, means for instructing and means for modifying may include a processing system, which may include one or more processors, such as processors 266, 258, 264, and/or controller/processor 280 of the UE 120 and/or processors 220, 230, 238, and/or controller/processor 240 of the BS 110 shown in FIG. 2.

In some cases, rather than actually transmitting or sending a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer.

In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system. For example, in some cases, processors such as those shown in FIG. 2 may be configured to perform operations 700 of FIG. 7, operations 800 of FIG. 8, and/or operations 900 of FIG. 9.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 7-9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a first wireless node, comprising:
   detecting a first synchronization signal block (SSB) from a second wireless node;
   determining, based on detecting the first SSB, resources for sending an indication of interference coordination to the second wireless node; and
   sending the indication of interference coordination to the second wireless node using the determined resources, as part of an interference coordination procedure, wherein the sending the indication of interference coordination comprises sending a random access channel (RACH) preamble in a RACH occasion, and wherein at least one of a root index, a cyclic shift, a preamble length, a numerology, or a timing, of a RACH preamble format implicitly indicates the indication of interference coordination.

2. The method of claim 1, wherein:
   the determining is based on a synchronization signal block (SSB) transmission configuration (STC); and
   the indication of interference coordination is sent via an SSB transmission from the first wireless node in accordance with the STC.

3. The method of claim 2, wherein the SSB transmission is sent within a window, defined by the STC, that aligns with an SSB measurement timing configuration (SMTC) window of the second wireless node.

4. The method of claim 1, wherein the indication of interference coordination comprises a request to the second wireless node to send an indication of interference coordination to a third wireless node.

5. The method of claim 1, wherein the determining the resources for sending the indication of interference coordination comprises:
   identifying at least one RACH occasion associated with the first SSB for sending the indication of interference coordination.

6. The method of claim 5, wherein the indication of interference coordination comprises a request that the second wireless node perform a power backoff in at least a direction associated with the first SSB.

7. The method of claim 1, wherein the indication of interference coordination comprises at least one of:
   a measured channel quality metric between the first wireless node and the second wireless node; or
   an estimate of path loss (PL) between the first wireless node and the second wireless node, in a direction associated with the first SSB.

8. The method of claim 1, wherein the indication of interference coordination comprises at least one of:
   a power management priority level of the first wireless node;
   a request for a power management priority level of the second wireless node or a wireless device scheduled by the second wireless node;
   an identifier ID of the first wireless node or of one or more cells served by the first wireless node; or
   assistance information indicating a transmission configuration for the second wireless node or the wireless device scheduled by the second wireless node.

9. The method of claim 8, wherein the transmission configuration comprises at least one of a transmission power, a transmission power range, a periodicity of transmissions, a number of transmission occasions per period, frequency domain resources, or a beam configuration.

10. The method of claim 1, further comprising receiving a configuration for sending the indication of interference coordination via at least one of radio resource control (RRC) signaling or an application protocol message.

11. A method for wireless communication by a first wireless node, comprising:
    transmitting synchronization signal blocks (SSBs) in different directions;
    obtaining a signal with an indication of interference coordination sent from a second wireless node as part of an interference coordination procedure, wherein the indication of interference coordination is in a random access channel (RACH) occasion associated with a first SSB of the SSBs, wherein obtaining the indication of interference coordination comprises obtaining a RACH preamble in the RACH occasion, and wherein at least one of a root index, a cyclic shift, a preamble length, a numerology, or a timing, of a RACH preamble format implicitly indicates the indication of interference coordination; and participating in the interference coordination procedure with the second wireless node based on the indication.

12. The method of claim 11, wherein the signal with the indication of interference coordination is a SSB transmission.

13. The method of claim 12, wherein the SSB transmission is detected within an SSB measurement timing configuration (SMTC) window of the first wireless node that aligns with an SSB transmission configuration (STC) window of the second wireless node.

14. The method of claim 11, wherein the participating comprises sending an indication of interference coordination to a third wireless node.

15. The method of claim 11, wherein the indication of interference coordination conveys at least one of:
 a channel quality metric between the first wireless node and the second wireless node; or
 an estimate of path loss (PL) between the first wireless node and the second wireless node, in a direction associated with the first SSB.

16. The method of claim 11, wherein the indication of interference coordination conveys at least one of:
 a power management priority level of the second wireless node;
 a request for a power management priority level of the first wireless node or a wireless device scheduled by the first wireless node;
 an identifier (ID) of the second wireless node or of one or more cells served by the second wireless node; or
 assistance information indicating a transmission configuration for the first wireless node or the wireless device scheduled by the first wireless node.

17. The method of claim 16, wherein the transmission configuration indicates at least one of a transmission power, a transmission power range, a periodicity of transmissions, a number of transmission occasions per period, frequency domain resources, or a beam configuration.

18. The method of claim 16, wherein the participating comprises at least one of:
 modifying a transmission configuration of at least one of a distributed unit (DU) of the first wireless node;
 modifying a transmission configuration of a child node of the first wireless node;
 sending one or more power management priority levels of the first wireless node to the second wireless node or a centralized unit (CU);
 sending one or more power management priority levels of the child node of the first wireless node to the second wireless node or the CU;
 instructing the child node of the first wireless node to send, the one or more power management priority levels of the first wireless node or the child node of the first wireless node, to the second wireless node or the CU;
 sending the one or more power management priority levels of the first wireless node or the child node of the first wireless node in a broadcast message; or
 sending the ID of the second wireless node or of the one or more cells served by the second wireless node to the CU or the child node of the first wireless node.

19. The method of claim 11, wherein:
 the indication of interference coordination comprises a request that the first wireless node perform a power backoff in at least a direction associated with the first SSB; and
 the participating comprises performing the power backoff.

20. The method of claim 11, further comprising receiving a configuration for detecting the indication of interference coordination via at least one of radio resource control (RRC) signaling or an application protocol message.

* * * * *